(12) United States Patent
Chen (10) Patent No.: US 8,467,304 B2
(45) Date of Patent: Jun. 18, 2013

(54) SELF-CONFIGURATION FOR FEMTOCELLS

(75) Inventor: Jen Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 12/142,426

(22) Filed: Jun. 19, 2008

(65) Prior Publication Data

US 2009/0316649 A1 Dec. 24, 2009

(51) Int. Cl.
*G08C 15/00* (2006.01)
*H04J 1/16* (2006.01)
*H04L 12/26* (2006.01)
*H04L 12/28* (2006.01)
*H04B 7/216* (2006.01)

(52) U.S. Cl.
USPC .......................... 370/252; 370/254; 370/441

(58) Field of Classification Search
None
See application file for complete search history.

(56) References Cited

U.S. PATENT DOCUMENTS

| | | | |
|---|---|---|---|
| 6,134,215 A * | 10/2000 | Agrawal et al. | 370/209 |
| 6,275,483 B1 * | 8/2001 | Papasakellariou et al. | 370/335 |
| 7,039,425 B1 * | 5/2006 | Mazawa et al. | 455/456.4 |
| 7,395,064 B2 | 7/2008 | Demirhan et al. | |
| 8,059,568 B1 * | 11/2011 | Barbee et al. | 370/304 |
| 8,274,947 B1 * | 9/2012 | Fang et al. | 370/331 |
| 2007/0097938 A1 * | 5/2007 | Nylander et al. | 370/338 |
| 2007/0097939 A1 * | 5/2007 | Nylander et al. | 370/338 |
| 2009/0052395 A1 * | 2/2009 | Bao et al. | 370/331 |
| 2009/0061924 A1 * | 3/2009 | Morrill et al. | 455/552.1 |
| 2009/0154447 A1 * | 6/2009 | Humblet | 370/350 |
| 2009/0156165 A1 * | 6/2009 | Raghothaman et al. | 455/411 |
| 2010/0260068 A1 * | 10/2010 | Bhatt et al. | 370/254 |

FOREIGN PATENT DOCUMENTS

| | | |
|---|---|---|
| EP | 0865172 | 9/2009 |
| JP | 2007251755 A | 9/2007 |
| JP | 2007266785 A | 10/2007 |
| JP | 2007329758 A | 12/2007 |
| JP | 2009510973 A | 3/2009 |
| JP | 2009529829 A | 8/2009 |
| WO | 0193617 | 12/2001 |
| WO | 2007040454 A2 | 4/2007 |

OTHER PUBLICATIONS

U.S. Appl. No. 60/977,831, Fang et al., Oct. 5, 2007, paragraphs [0016]-[0019].*
International Search Report, PCT/US2008/080035—International Search Authority—European Patent Office, Mar. 31, 2009.
Written Opinion, PCT/US2008/080035—International Search Authority—European Patent Office, Mar. 31, 2009.

* cited by examiner

*Primary Examiner* — Chirag Shah
*Assistant Examiner* — Ashley Shivers
(74) *Attorney, Agent, or Firm* — Florin C. Corie (57) ABSTRACT

Systems and methodologies are described that facilitate automatically configuring femtocells based at least in part on signals transmitted by other femtocells and macrocells. In particular, a femtocell can receive signals from neighboring cells, much like a mobile device, and determine communications parameters used. The parameters can be channel identifiers, pseudo-noise (PN) offsets, and the like. The femtocell can subsequently configure its communication parameters to vary from those detected in the neighboring signals, or to match those of neighboring signals where the parameters relate to the communications environment, for example. Thus, the femtocell self-configures to mitigate interference with surrounding femtocells and/or macrocells.

25 Claims, 8 Drawing Sheets

SELF-CONFIGURATION FOR FEMTOCELLS

BACKGROUND

I. Field

The following description relates generally to wireless communications, and more particularly to femtocells in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), universal mobile telecommunications system (UMTS), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In more recent technology, femtocells have been developed allowing consumers to provide cellular access where normal base station support is weak or unavailable (e.g., indoors, remote locations, and the like). Femtocells are essentially small base stations that connect to wireless service providers via a broadband backhaul link, such as digital subscriber line (DSL), cable internet access, T1/T3, etc., and offer typical base station functionality, such as base transceiver station (BTS) technology, radio network controller, and gateway support node services. This allows cellular devices to connect to the femtocells and utilize the wireless service. Femtocells are small in size allowing the average consumer to purchase the femtocell at a retail store and install it in her residence.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with auto- or self-configuration of femtocells to mitigate interference among the femtocells and/or macrocells, as femtocells are deployed without planning, unlike macrocells. In particular, femtocells can receive overhead message signals from neighboring femtocells and/or macrocells, much like a cellular phone receiver, and configure itself based at least in part on the received messages. For example, the femtocells can analyze the overhead message signals to determine one or more configuration parameters determined from the signals. The femtocells can also mitigate communication interference by determining a channel identifier, pseudo-noise (PN) offset, and/or other parameters for the transmitting cells from the signals and accordingly differently configuring its channel identifier, PN offset, etc. Moreover, the overhead signals received by the femtocell can be utilized to determine timing and/or location for the femtocell; the location can be leveraged for additional information, such as available frequencies for an operator related to the femtocell.

According to related aspects, a method that facilitates self-configuration of femtocells in wireless communication networks is provided. The method comprises receiving communication signals from one or more disparate femtocells or macrocells. The method can additionally include determining a set of values of at least one communication parameter from the communication signals and automatically configuring a value of the communication parameter for a femtocell based at least in part on the set of values.

Another aspect relates to a wireless communications apparatus. The wireless communications apparatus can include at least one processor configured to infer a set of values for a communication parameter utilized by one or more disparate femtocells and/or macrocells. The at least one processor can further be configured to auto-configure a value for the communication parameter outside of the set of values and provide wireless communication service to one or more mobile devices based at least in part on the auto-configured value. The wireless communications apparatus can also include a memory coupled to the at least one processor.

Yet another aspect relates to a wireless communications apparatus that facilitates self-configuration from sensed utilized communication parameters. The wireless communications apparatus can comprise means for determining one or more utilized communication parameters from wireless signals transmitted by one or more femtocells or macrocells. The wireless communications apparatus can additionally include means for automatically configuring disparate communication parameters for providing wireless communication access to one or more devices to mitigate interference with the one or more femtocells or macrocells.

Still another aspect relates to a computer program product, which can have a computer-readable medium including code for causing at least one computer to receive communication signals from one or more disparate femtocells or macrocells. The computer-readable medium can also comprise code for causing the at least one computer to determine a set of values of at least one communication parameter from the communication signals. Moreover, the computer-readable medium can comprise code for causing the at least one computer to configure a value of the communication parameter for a femtocell based at least in part on the set of values.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, evolved Node B (eNode B or eNB), base transceiver station (BTS) or some other terminology. A femtocell can be a small base station providing base station like functionality to one or more devices with a broadband backhaul link to a wireless service provider (e.g., over digital subscriber line (DSL), cable internet, T1/T3, and/or the like). It is to be appreciated that the femtocell can additionally communicate with the wireless service provider via one or more femtocells or macrocells. Femtocells are typically small enough in size to purchase at a retail store and install in a residence or building, for example.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project"

(3GPP). CDMA2000 and UMB are described in documents from an organization named "3rd Generation Partnership Project 2" (3GPP2).

Figure 1:
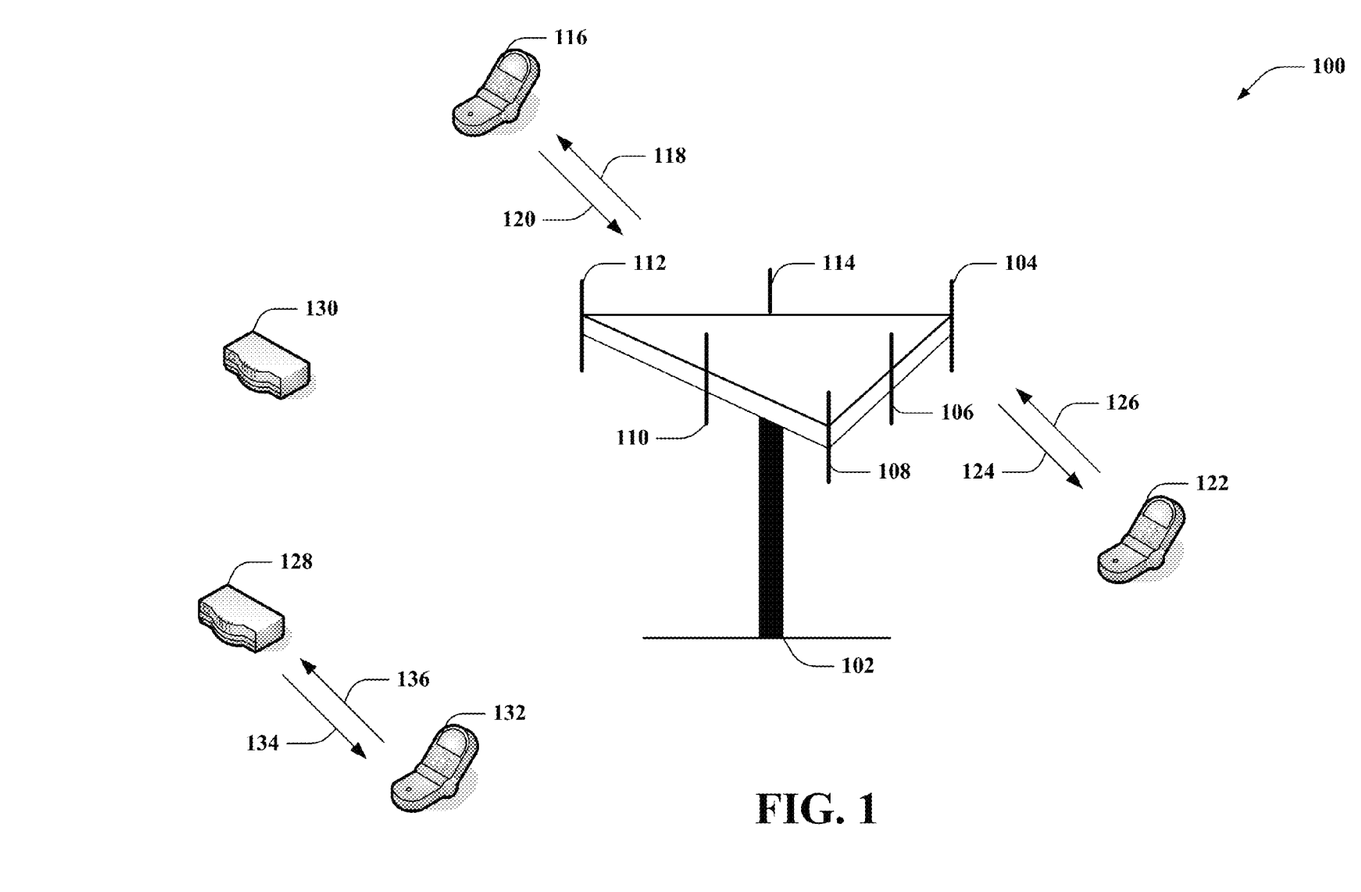
FIG. 1 is an illustration of a wireless communication system in accordance with various aspects set forth herein.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

Similar functionality of the base station 102 can be implemented in femtocells 128 and 130, which can be deployed in smaller scale locations, such as a residence or office building for example. As mentioned, the femtocells 128 and 130 can have a broadband backhaul link to a wireless service provider, such as over DSL, cable, T1/T3, etc., and can provide wireless communication service to one or more mobile devices. As shown, femtocell 128 can communicate with one or more mobile devices 132 over a forward link 134 and receive communication from the mobile devices 132 over a reverse link 136 similarly to the base station 102. Because the femtocell is portable, it can be installed in many locations by many different entities without a planned deployment, unlike base station 102 macrocells. To this end, femtocells can be self-configurable, as described herein, so not to interfere with surrounding femtocells or macrocells.

According to an example, femtocell 130 can be deployed to provide wireless service access. Femtocell 130 can connect to a wireless service access provider via broadband backhaul link, one or more disparate femtocells or macrocells over-the-air, etc. Upon being deployed, femtocell 130 can self-configure to avoid interference with surrounding femtocells (such as femtocell 128) and macrocells (such as base station 102 or a sector/cell thereof). In this regard, the femtocell 130 can receive signals from the base station 102 and disparate femtocell 128 much like mobile devices 116, 122, and 132. The signals can be overhead system messages that can be utilized by the femtocell 130 to determine configuration parameters utilized by the disparate femtocell 128 and/or base station 102. The configuration parameters can be determined by the femtocell 130 for similar environment configuration. In addition, the parameters can be determined and utilized to ensure the femtocell 130 selects different parameters to mitigate interference. These parameters can include, for example, a channel identifier (e.g., a CDMA channel ID), a pseudo-noise (PN) offset, and/or the like, for the femtocell 128, base station 102, and/or substantially any other surrounding transmitters. The femtocell 130 can accordingly self-configure its channel identifier, PN offset, etc. so as not to interfere with the surrounding femtocells and macrocells. Additionally, the femtocell 130 can utilize this information to build a neighbor list of surrounding femtocells and macrocells to facilitate hard and soft handoffs for devices communicating with the femtocell 130. Moreover, the femtocell 130 can receive RF signals, for example, from the femtocell 128 and/or base station 102 to determine timing, location, and/or the like.

Figure 2:
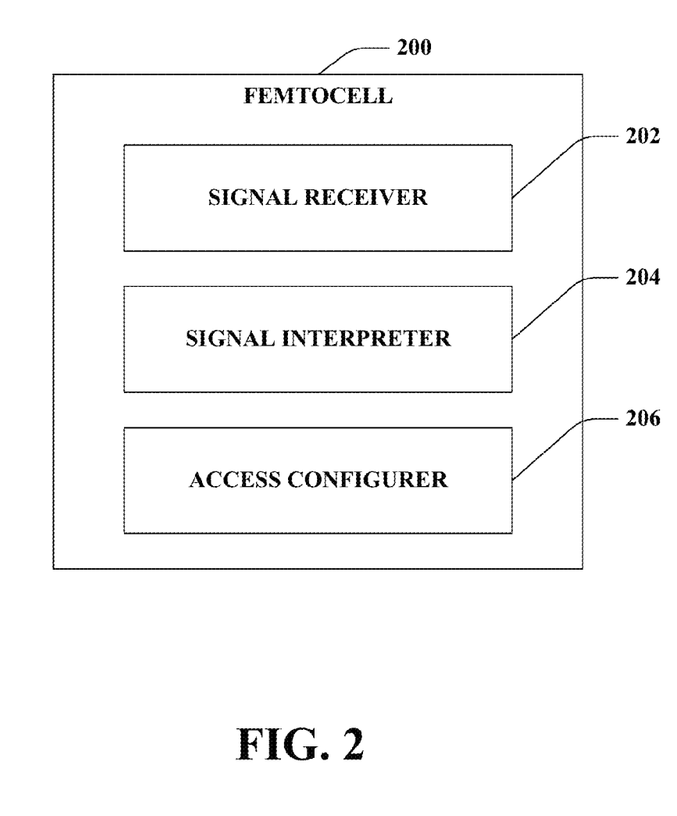
FIG. 2 is an illustration of an example communications apparatus for employment within a wireless communications environment.

Turning to FIG. 2, illustrated is a femtocell 200 for employment within a wireless communications environment. The femtocell 200 can, as described, provide cellular base station-like services to one or more mobile devices by connecting to a wireless service provider via broadband backhaul link. As mentioned, it is to be appreciated that the femtocell 200 can provide wireless communications services by connecting to one or more disparate femtocells or macrocells in another example. The femtocell 200 can comprise a signal receiver 202 that can receive overhead system messages in a wireless communications network, a signal interpreter 204 that can determine used communication parameters from the system messages, and an access configurer 206 that can automatically configure the femtocell 200 to provide access to mobile devices using disparate parameters so not to interfere with the cells transmitting the system messages.

According to an example, the signal receiver 202 can receive a variety of signals being transmitted by one or more devices, including disparate femtocells, macrocells, mobile devices, or substantially any transmitter. In one example, at least a portion of the signals can relate to providing wireless service access. The signal interpreter 204 can analyze the signals to determine aspects of the existing signals to minimize interference in configuring the femtocell 200. This can be accomplished using substantially the same techniques and/or protocols as wireless devices interpreting the communications. For example, the signal interpreter 204 can determine a channel identifier (e.g., a CDMA channel ID), a PN offset, a frequency utilized by the signal, timing utilized, or substantially any parameter the femtocell 200 could differentiate to be unique among the transmitters. Moreover, the signal interpreter 204 can additionally determine environment configuration parameters of surrounding femtocells and/or macrocells to mirror or otherwise utilize in self-configuration. Because femtocell deployment is not planned, like macrocells, the configuration parameters can be utilized to self-configure the femtocell 200 to select similar parameters necessary to operate in the environment and mitigate interference with other cells by selecting disparate values for some parameters.

Additionally, the signal interpreter 204 can receive other signals from the cells, such as RF signals and/or the like, comprising timing information, location information, etc. The values can be embedded in the signals, in one example. The femtocell 200 can utilize the parameters to configure its timing and/or derive its location, for example. Additionally or alternatively, the location information can be transmitted to the wireless network connected to the femtocell 200 via broadband backhaul as described, in one example. The network can provide further information indicating location, timing, valid frequency ranges for transmission, and/or the like.

Figure 3:
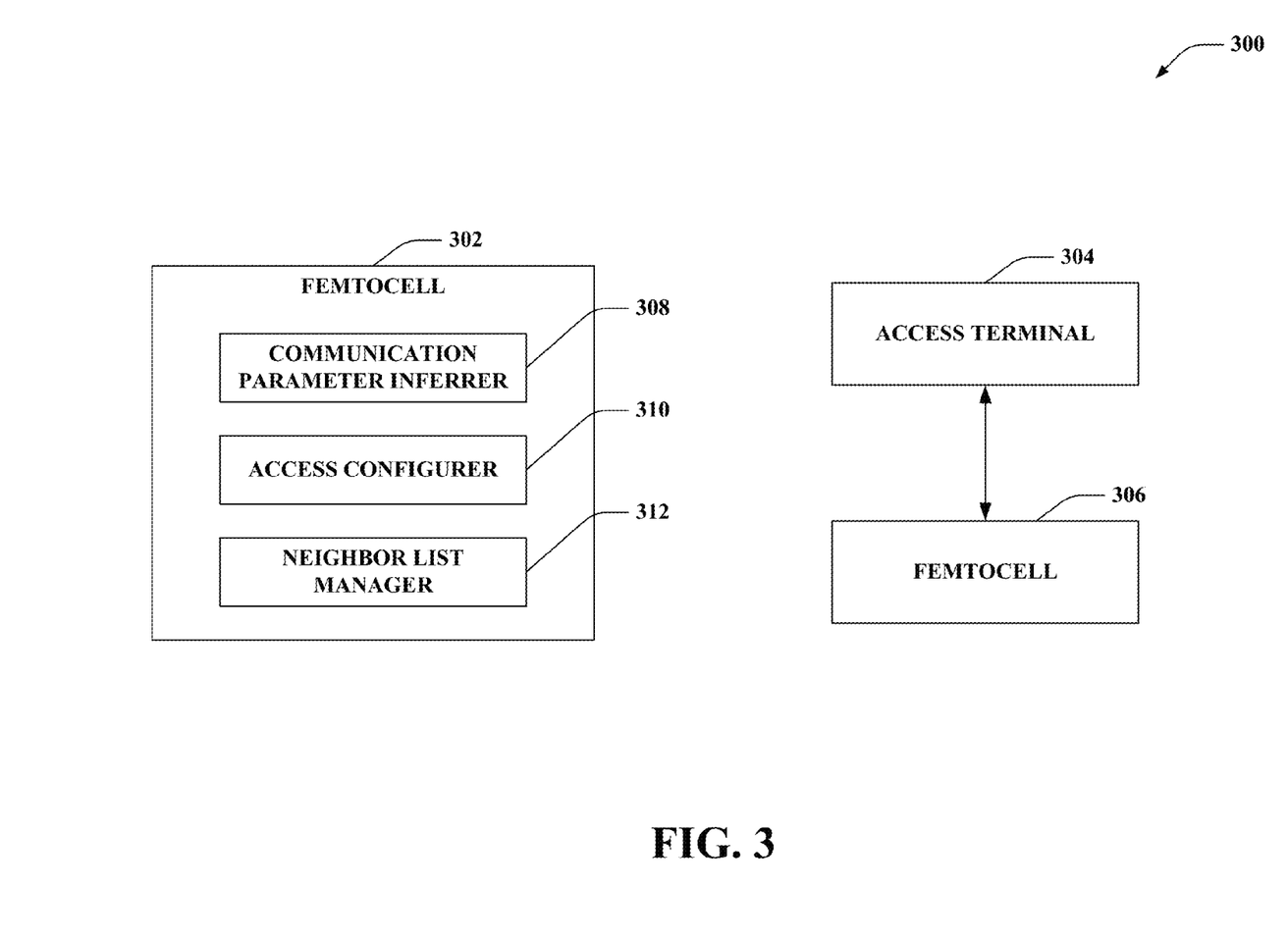
FIG. 3 is an illustration of an example wireless communications system that facilitates self-configuration of a femtocell.

Using the analyzed information, the access configurer 206 can choose similar values for determined parameters based on the environment, for example, and/or disparate values for some parameters to uniquely identify itself among the transmitters. In one example, as mentioned, the signal interpreter 204 can determine CDMA channel IDs and PN offsets utilized by a plurality of neighboring transmitting devices. The access configurer 206 can select a disparate CDMA channel ID and PN offset to be utilized by the femtocell 200 in transmitting information to one or more devices. Thus, the femtocell 200 can transmit data without interfering on communications by neighboring femtocells, macrocells, or other transmitters. It is to be appreciated that the access configurer 206 can further choose parameters, such as a channel ID and PN offset, according to one or more policies or specifications (e.g., network or protocol related policies or specifications). Thus, there can be a specified limit on a number of available channel IDs or PN offsets, for example, and the access configurer 206 can choose available parameters within the limits and according to what is already being utilized by neighboring femtocells and macrocells, in one example Now referring to FIG. 3, illustrated is a wireless communications system 300 that can facilitate self-configuring femtocells. The system 300 includes a femtocell 302 that can automatically configure itself for employment in a wireless communications network. Further, an access terminal 304 and femtocell 306 are provided where the femtocell 306 can transmit information to the access terminal 304 over a forward link channel; further femtocell 306 can receive information from the access terminal 304 over a reverse link channel. Additionally, the system 300 can operate in an OFDMA wireless network (such as 3GPP, 3GPP2, 3GPP LTE, etc., for example) where the femtocell 306 provides wireless access service to the access terminal 304. Also, the components and functionalities shown and described below in the femtocell 302 can be present in the femtocell 306 and vice versa, in one example.

The femtocell 302 includes a communication parameter inferrer 308 that can infer parameters used in communication between the femtocell 306 and access terminal 304, an access configurer 310 that can accordingly configure the femtocell 302 to similarly communicate with access terminals, and a neighbor list manager 312 that can generate and store a list of neighboring cells (e.g., femtocells or macrocells) for soft or hard handoff of subsequent communicating access terminals. For example, the communication parameter inferrer 308 can listen or receive signals transmitted from the femtocell 306 or other cells and identify the cells, configuration parameters, and/or protocols used. The signals can be transmitted to the access terminal 304 or transmitted generally, such as a pilot or reference signal, in one example. Similarly to the access terminal 304 desiring access to utilize the femtocell 306, the communication parameter inferrer 308 can determine or infer information regarding the femtocell 306 and its communication parameters and/or protocols from the signals.

For example, as mentioned, the communication parameter inferrer 308 can identify the femtocell 306 as well as a utilized communication channel ID, for example, a PN offset, and/or the like. This can be done for substantially any cell in the area, where the femtocell 302 acts like a mobile receiver to determine relevant parameters and cell identifiers. Subsequently, the access configurer 310 can set communication parameters for the femtocell 302 differently from those inferred by the communication parameter inferrer 308. In one example, where the parameter is a protocol or other environment parameters, the access configurer 310 can configure the femtocell 302 similarly so that it utilizes the same protocol, but differently for other identifying parameters. It is to be appreciated that the communication parameters can be subsequently modified once set, for example, according to network conditions inferred by the communication parameter inferrer 308. In addition, the identified information can be utilized by the neighbor list manager 312 to create a list of neighboring cells for subsequent handoff for communicating access terminals. Thus, upon identifying femtocell 306 and its communications parameters, femtocell 306 can be populated in the neighbor list generated by the neighbor list manager 312.

In one example, the communication parameter inferrer 308 can also receive timing and/or location information, or can infer such information, from the signals (or disparate signals, such as RF signals, for example). The information can be utilized by the access configurer 310 to set timing, for example. In addition, the information can be utilized to further determine information regarding frequencies the femtocell 302 can legally utilize for communications as well as which disparate femtocells can be utilized for handover. For example, where a disparate femtocell is private or utilizes a disparate wireless network, handover may not be desirable. Thus, this information can additionally be utilized by the neighbor list manager 312 in building a neighbor list in this regard. Upon subsequent communication with an access terminal where handoff is desired, the neighbor list manager 312 can return a list of discovered neighboring cells and other information, such as signal strength, direction, capacity, etc., which can have been originally inferred by the communication parameter inferrer 308. According to the parameters, the access terminal can be handed off as desired, for example to a neighboring femtocell having a desired directionality.

Figure 4:
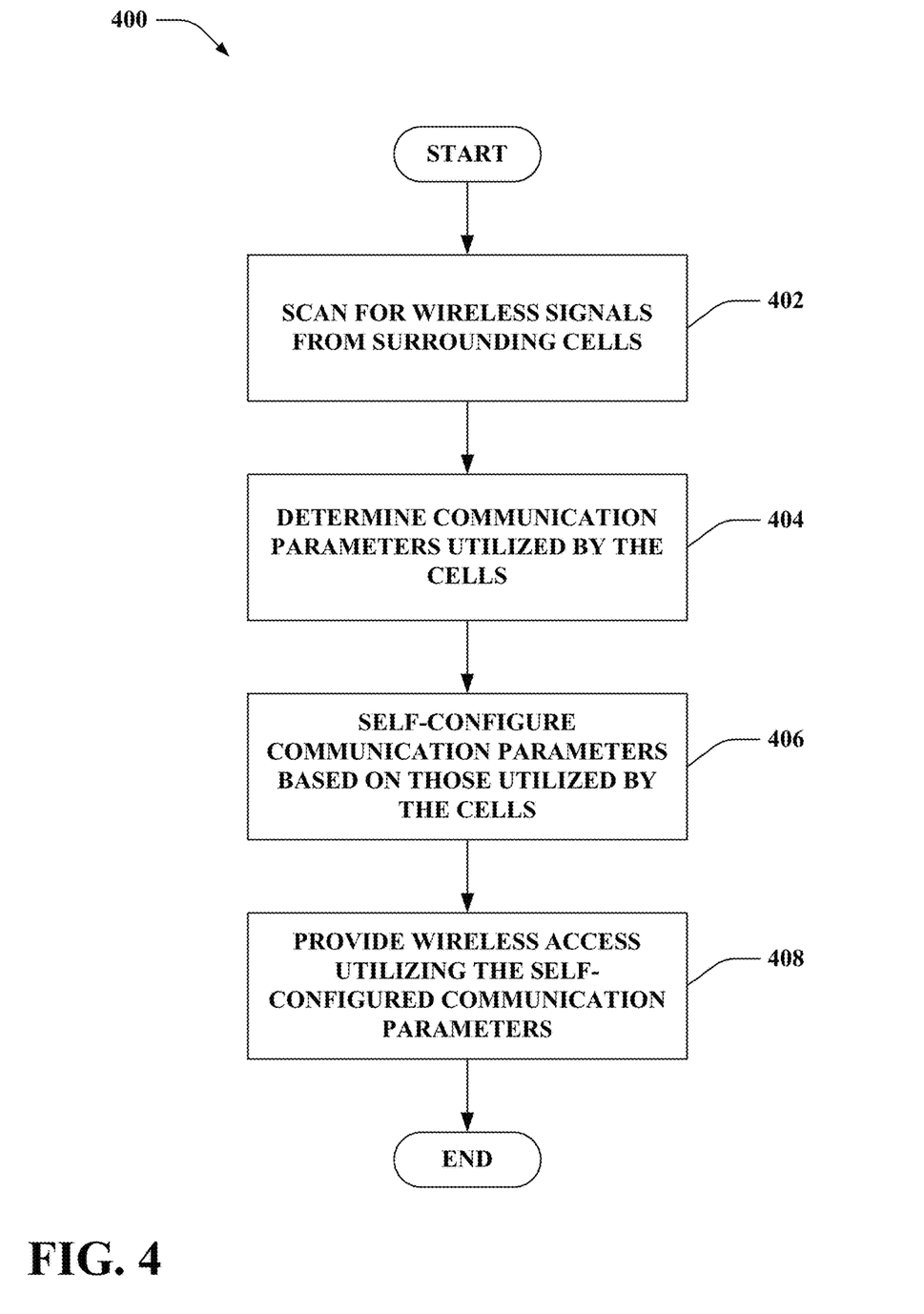
FIG. 4 is an illustration of an example methodology that facilitates self-configuring a femtocell based on neighboring signals.
Figure 5:
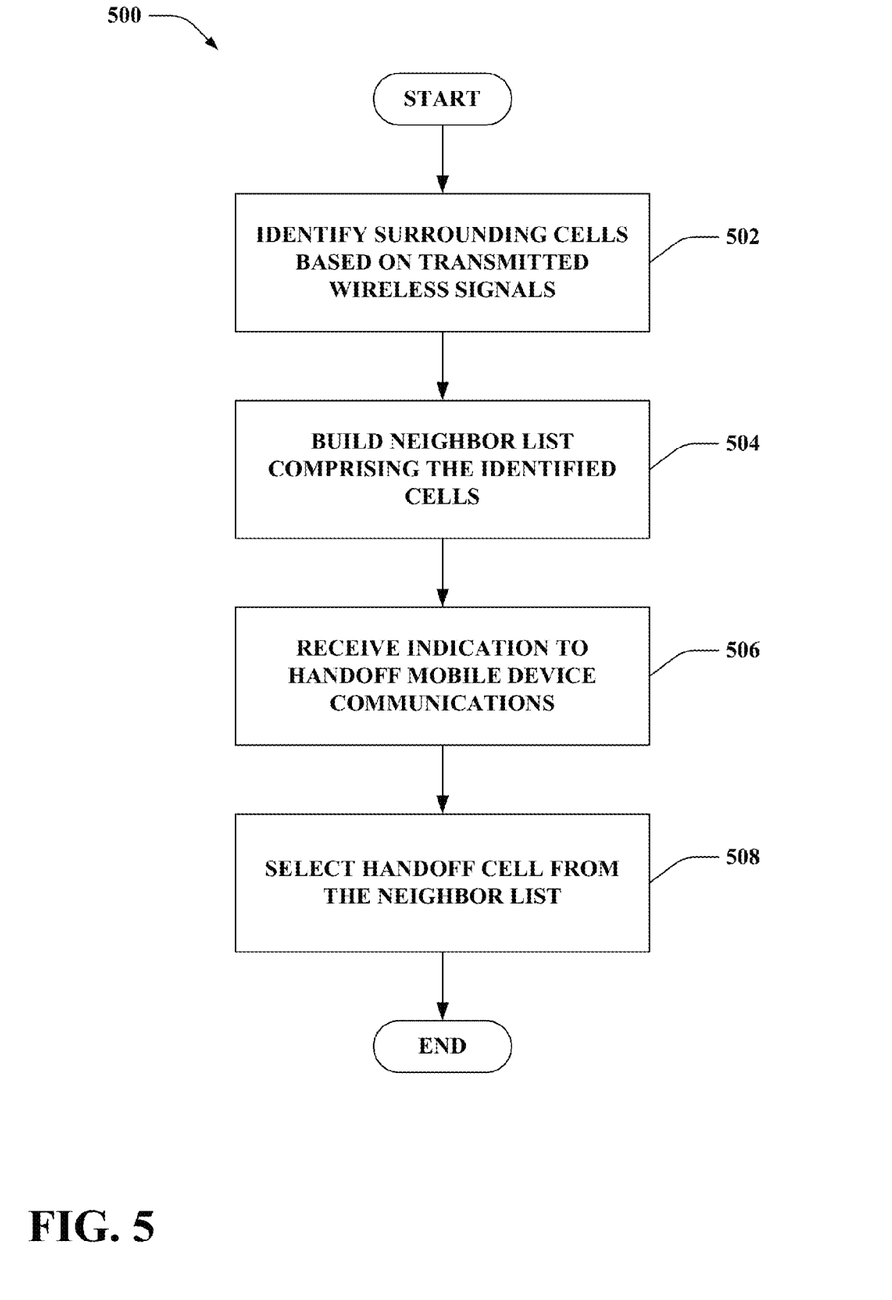
FIG. 5 is an illustration of an example methodology that facilitates generating a neighboring cell list for subsequent communication handoff.

Referring to FIGS. 4-5, methodologies relating to auto-configuring femtocells from sensed parameters are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is an example methodology 400 that facilitates automatically configuring a femtocell based on signals of surrounding wireless communication cells. At 402, scanning for wireless signals from surrounding cells can occur. The scanning can receive signals transmitted from various femtocells and/or macrocells as described. It is to be appreciated that other signals can be discovered as well. At 404, communication parameters utilized by the cells can be determined from the signals. These can include channel identifiers, PN offsets, and/or the like as described. At 406, communications parameters can be self-configured based on those utilized by the cells. Thus, as described, values for configuring the femtocell can be similarly where the parameter relates to a communications environment in which the disparate cell(s) is/are participating. However, values for other communications parameters, such as communications channel and/or PN offset, can be set to disparate values during self-configuration to prevent interference with the disparate cells. At 408, wireless access can be provided using the self-configured communication parameters.

Now referring to FIG. 5, an example methodology 500 that facilitates creating a neighbor list of cells for subsequent handoff of communications is shown. At 502, surrounding cells can be identified based on the transmitted wireless signals. As described, this can be performed during self-configuration where surrounding cells can be detected and communications parameters determined ensuring self-configuration of different parameters to mitigate interference. At 504, a neighbor list comprising the identified cells can be built. As described, the list can comprise a listing of the cells identified during self-configuration as well as communication parameters detected. Moreover, the list can be updated based at least in part on a network event, update of configuration parameters, notification, and/or the like. At 506, an indication to handoff mobile device communications can be received. The neighbor list can be retrieved, and at 508, a handoff cell from the neighbor list can be selected, to which the mobile device communication can be handed off.

It will be appreciated that, in accordance with one or more aspects described herein, inferences can be made regarding determining communication parameters for a plurality of surrounding femtocells and/or macrocells as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
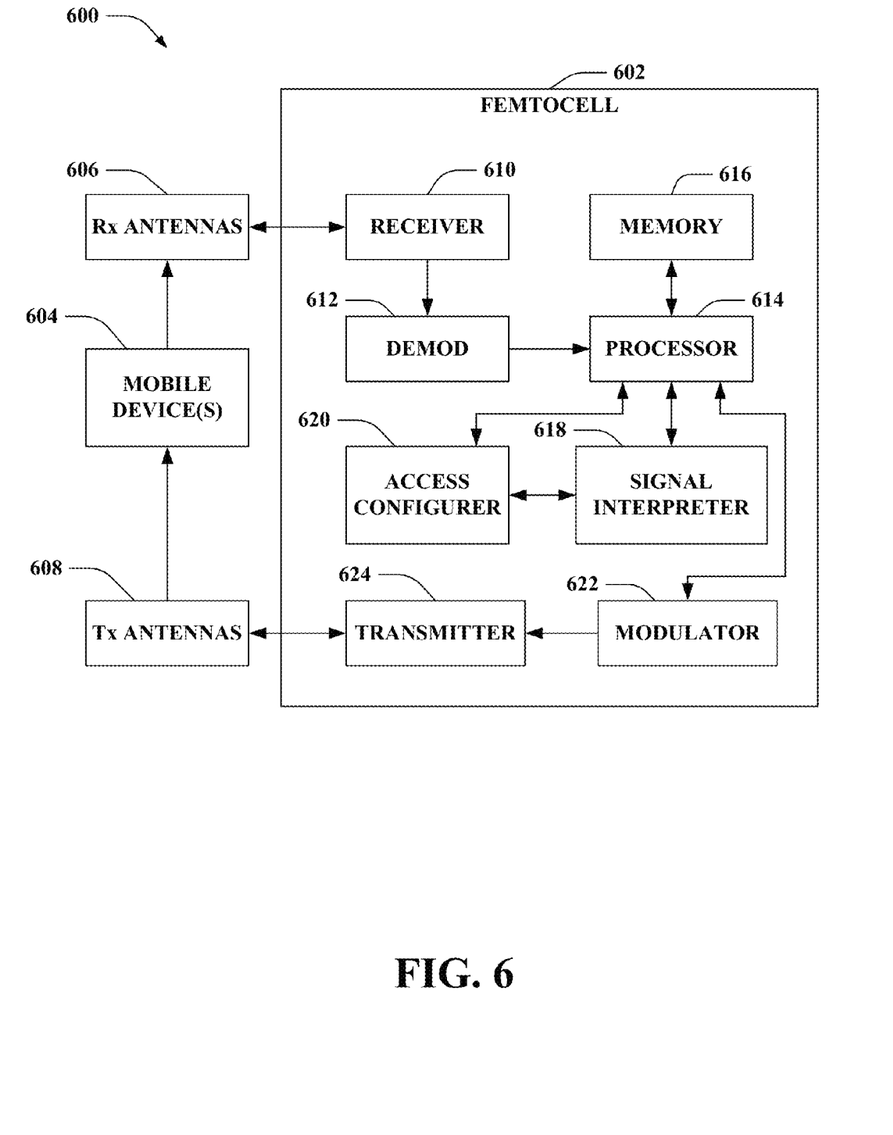
FIG. 6 is an illustration of an example system that facilitates self-configuring a femtocell.

FIG. 6 is an illustration of a system 600 that facilitates utilizing a self-configurable femtocell to provide wireless communication services. The system 600 comprises a femtocell 602 (e.g., access point, . . . ) with a receiver 610 that receives signal(s) from one or more mobile devices 604 through a plurality of receive antennas 606, and a transmitter 624 that transmits to the one or more mobile devices 604 through a transmit antenna 608. Receiver 610 can receive information from receive antennas 606 and is operatively associated with a demodulator 612 that demodulates received information. Demodulated symbols are analyzed by a processor 614 which is coupled to a memory 616 that stores information related to estimating a signal (e.g., pilot) strength and/or interference strength, data to be transmitted to or received from mobile device(s) 604 (or a disparate base stations or femtocells (not shown)), and/or any other suitable information related to performing the various actions and functions set forth herein. The femtocell 602 can additionally provide wireless communication services to the mobile devices 604 by utilizing a broadband backhaul link where necessary to communicate with core wireless network components (not shown).

Processor 614 can be a processor dedicated to analyzing information received by receiver 610 and/or generating information for transmission by a transmitter 624, a processor that controls one or more components of femtocell 602, and/or a processor that both analyzes information received by receiver 610, generates information for transmission by transmitter 624, and controls one or more components of femtocell 602.

Femtocell 602 can additionally comprise memory 616 that is operatively coupled to processor 614 and that can store data to be transmitted, received data, information related to available channels, data associated with analyzed signal and/or interference strength, information related to an assigned channel, power, rate, or the like, and any other suitable information for estimating a channel and communicating via the channel. Memory 616 can additionally store protocols and/or algorithms associated with estimating and/or utilizing a channel (e.g., performance based, capacity based, etc.).

It will be appreciated that the memory 616 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 614 is further coupled to a signal interpreter 618 that can receive and analyze signals from disparate femtocells or macrocells as described supra. For example, the signal interpreter 618 can sense or collect a plurality of neighboring signals from disparate transmitters. The signal interpreter 618 can subsequently determine communication parameters utilized to transmit the signals, much like a mobile device 604. In this regard, the signal interpreter 618 can discern communication channel identifiers, PN offsets, frequencies, timings, and/or substantially any communication parameters used by the disparate transmitters. Utilizing this information, the access configurer 620 can set communication parameters for the femtocell 602 different from those determined by the signal interpreter 618. In this way, the femtocell 602 can be automatically configured so as not to interfere with neighboring transmitters. Once configured, the femtocell 602 can communicate with and provide services to the mobile devices 604 as described. Additionally, it is to be appreciated that once configured, the access configurer 620 can modify the parameters based on network event or command (e.g., received over the air or through a broadband backhaul), information subsequently determined from the signal interpreter 618, and/or the like. Moreover, as mentioned, the access configurer 620 can set some similar parameters as utilized by other femtocells and/or macrocells in one example, such as protocol types and/or specifications. Furthermore, although depicted as being separate from the processor 614, it is to be appreciated that the signal interpreter 618, access configurer 620, demodulator 612, and/or modulator 622 can be part of the processor 614 or multiple processors (not shown).

Figure 7:
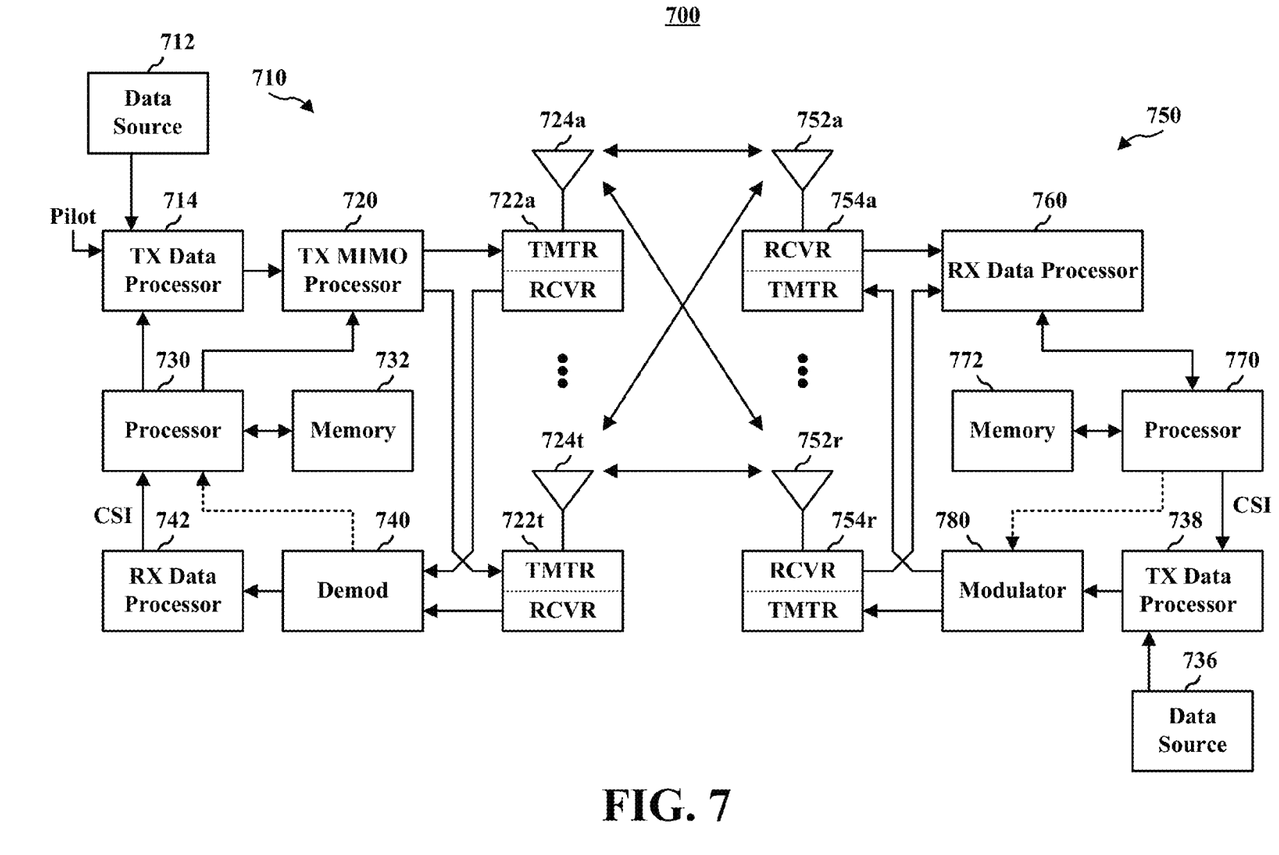
FIG. 7 is an illustration of an example wireless network environment that can be employed in conjunction with the various systems and methods described herein.

FIG. 7 shows an example wireless communication system 700. The wireless communication system 700 depicts one femtocell (or base station) 710 and one mobile device 750 for sake of brevity. However, it is to be appreciated that system 700 can include more than one femtocell (or base station) and/or more than one mobile device, wherein additional femtocells/base stations and/or mobile devices can be substantially similar or different from example femtocell 710 and mobile device 750 described below. In addition, it is to be appreciated that femtocell (or base station) 710 and/or mobile device 750 can employ the systems (FIGS. 1-3 and 6) and/or methods (FIGS. 4-5) described herein to facilitate wireless communication there between.

At femtocell 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at femtocell 710.

A processor 770 can periodically determine which preceding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to femtocell 710.

At femtocell 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at femtocell 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 8:
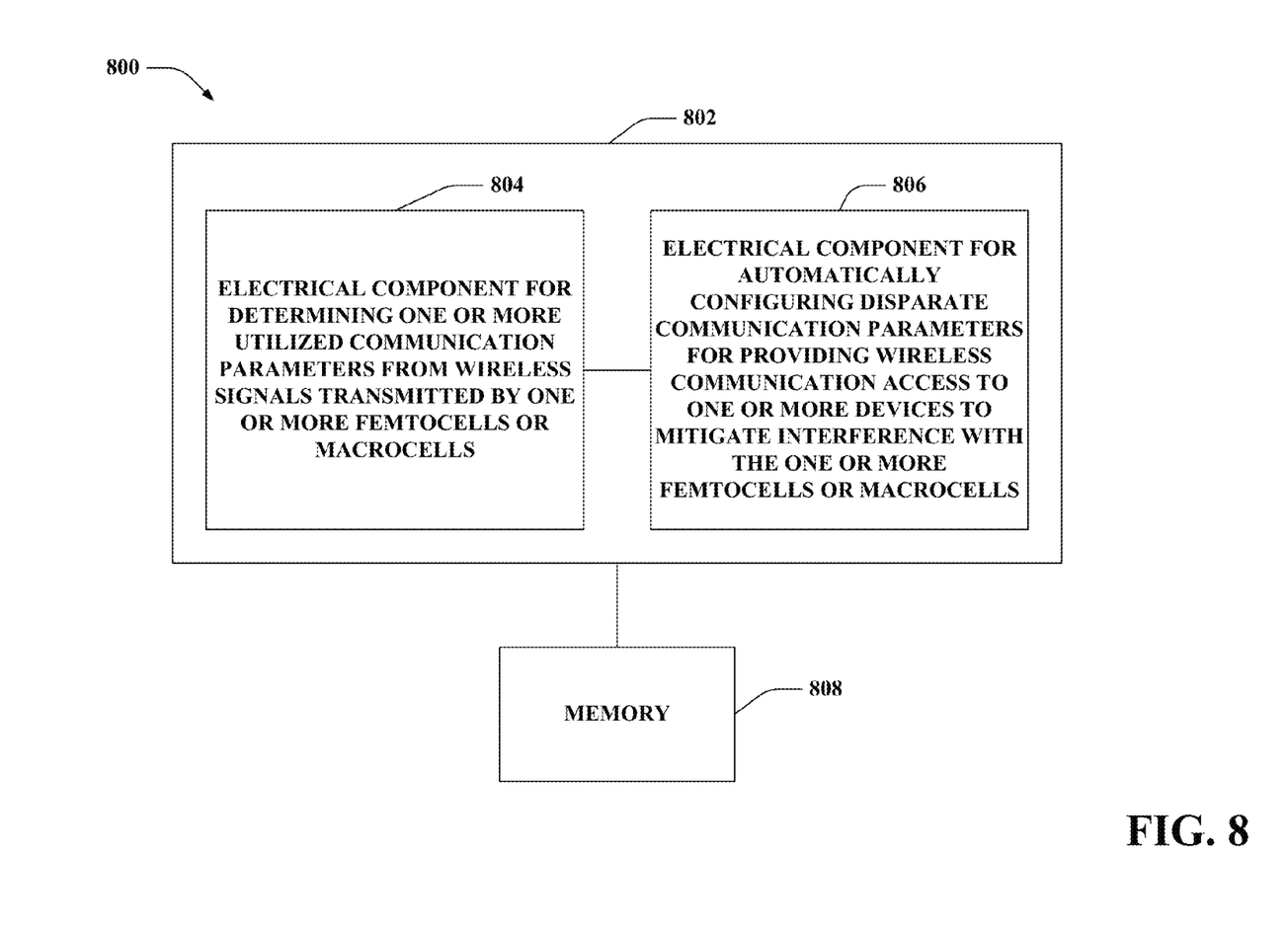
FIG. 8 is an illustration of an example system that self-configures a femtocell for employment in a wireless network.

With reference to FIG. 8, illustrated is a system 800 that facilitates automatically configuring a femtocell based at least in part on surrounding cells. For example, system 800 can reside at least partially within a femtocell, base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for determining one or more utilized communication parameters from wireless signals transmitted by one or more femtocells or macrocells 804. For example, upon sensing, detecting, or receiving a wireless signal, communication parameters can be determined therefrom. The parameters can relate to channel identifiers (such as CDMA channel IDs), PN offsets, or other communications parameters utilized by one or more femtocells or macrocells for communication with mobile devices. Moreover, logical grouping 802 can comprise an electrical component for automatically configuring disparate communication parameters for providing wireless communication access to one or more devices to mitigate interference with the one or more femtocells or macrocells 806. Thus, as mentioned, the system 800 can configure itself via electrical component 806 to not interfere with neighboring femtocells or macrocells in communicating with mobile devices by utilizing different communication parameters from those sensed in transmitted signals. Additionally, system 800 can include a memory 808 that retains instructions for executing functions associated with electrical components 804 and 806. While shown as being external to memory 808, it is to be understood that one or more of electrical components 804 and 806 can exist within memory 808.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates self-configuration of femtocells in wireless communication networks, comprising:
   receiving communication signals from one or more disparate femtocells or macrocells;
   determining a set of values of communication parameters from the communication signals, wherein the communication parameters comprise a channel identifier, timing information and a pseudo-noise (PN) offset; and
   automatically configuring a value of the communication parameters for a femtocell based at least in part on the set of values, wherein automatically configuring the value comprises configuring a PN offset for the femtocell to be disparate from the set of values determined.

2. The method of claim 1, further comprising automatically configuring another value of the communication parameters for the femtocell to be disparate from the set of values determined.

3. The method of claim 1, wherein the channel identifier is a code division multiple access (CDMA) channel identifier.

4. The method of claim 1, further comprising providing subsequent wireless communication access to at least one mobile device based at least in part on the value.

5. The method of claim 1, further comprising identifying the one or more disparate femtocells or macrocells based at least in part on the received communication signals.

6. The method of claim 5, further comprising populating a neighbor list with the one or more disparate femtocells or macrocells.

7. The method of claim 6, further comprising accessing the neighbor list to handoff communication from at least one mobile device to the one or more disparate femtocells or macrocells.

8. A wireless communications apparatus, comprising:
   at least one processor configured to:
      infer a set of values for communication parameters utilized by one or more disparate femtocells and/or macrocells, wherein the communication parameters comprise a channel identifier, timing, information and a pseudo-noise (PN) offset;
      auto-configure a value for the communication parameters for a femtocell outside of the set of values, wherein auto-configuring the value comprises configuring a PN offset for the femtocell to be disparate from the set of values inferred; and
      provide wireless communication service to one or more mobile devices based at least in part on the auto-configured value; and
   a memory coupled to the at least one processor.

9. The wireless communications apparatus of claim 8, wherein the channel identifier is a code division multiple access (CDMA) channel identifier.

10. The wireless communications apparatus of claim 8, wherein the at least one processor is further configured to receive in-range signals from the disparate femtocells and/or macrocells, wherein the set of values are inferred from the signals.

11. The wireless communications apparatus of claim 8, wherein the at least one processor is further configured to determine an identity for the one or more disparate femtocells or macrocells based at least in part on the set of values.

12. The wireless communications apparatus of claim 11, wherein the at least one processor is further configured to populate a neighbor list with identities and/or additional values of the set of values.

13. The wireless communications apparatus of claim 12, wherein the at least one processor is further configured to handoff mobile device communication to one or more disparate femtocells or macrocells in the neighbor list.

14. A wireless communications apparatus that facilitates self-configuration from sensed utilized communication parameters, comprising:
   means for determining one or more utilized communication parameters from wireless signals transmitted by one or more femtocells or macrocells, wherein the one or more utilized communication parameters comprises a channel identifier, timing information and a pseudo-noise (PN) offset; and
   means for automatically configuring disparate communication parameters for a femtocell for providing wireless communication access to one or more devices to mitigate interference with the one or more femtocells or macrocells, wherein automatically configuring the disparate communication parameters comprises configuring a PN offset for the femtocell to be disparate from the one or more utilized communication parameters determined.

15. The wireless communications apparatus of claim 14, further comprising means for receiving the wireless signals from the one or more femtocells or macrocells.

16. The wireless communications apparatus of claim 14, wherein the channel identifier is a code division multiple access (CDMA) channel identifier.

17. The wireless communications apparatus of claim 14, further comprising means for automatically configuring one or more of the disparate communication parameters similarly to the communication parameters from the one or more femtocells or macrocells.

18. The wireless communications apparatus of claim 14 further comprising means for transmitting determined communications parameters to a wireless network to receive additional information regarding the one or more femtocells or macrocells.

19. The wireless communications apparatus of claim 14, further comprising means for identifying the one or more femtocells or macrocells.

20. The wireless communications apparatus of claim 19, further comprising means for generating a neighbor list with the identified one or more femtocells or macrocells.

21. The wireless communications apparatus of claim 20, further comprising means for accessing the neighbor list during handoff of mobile device communication to the one or more femtocells or macrocells.

22. The wireless communications apparatus of claim 14, further comprising means for providing the wireless communication access to the one or more devices utilizing the configured disparate communication parameters.

23. A computer program product, comprising:
a non-transitory computer-readable medium comprising:
code for causing at least one computer to receive communication signals from one or more disparate femtocells or macrocells;
code for causing the at least one computer to determine a set of values of communication parameters from the communication signals, wherein the communication parameters comprise a channel identifier, timing information and a pseudo-noise (PN) offset; and
code for causing the at least one computer to configure a value of the communication parameters for a femtocell based at least in part on the set of values, wherein automatically configuring the value comprises configuring a PN offset for the femtocell to be disparate from the set of values determined.

24. The computer program product of claim 23, further comprising code for cause the at least one computer to configure another value of the communication parameters for the femtocell to be disparate from the set of values determined.

25. The computer program product of claim 23, wherein the computer-readable medium further comprising code for causing the at least one computer to provide subsequent wireless communication access to at least one mobile device based at least in part on the value.

* * * * *